Dec. 25, 1962  E. L. ZEBROSKI  3,070,532
NUCLEAR FUEL ELEMENT LEAK DETECTOR
Filed May 13, 1958  3 Sheets-Sheet 2
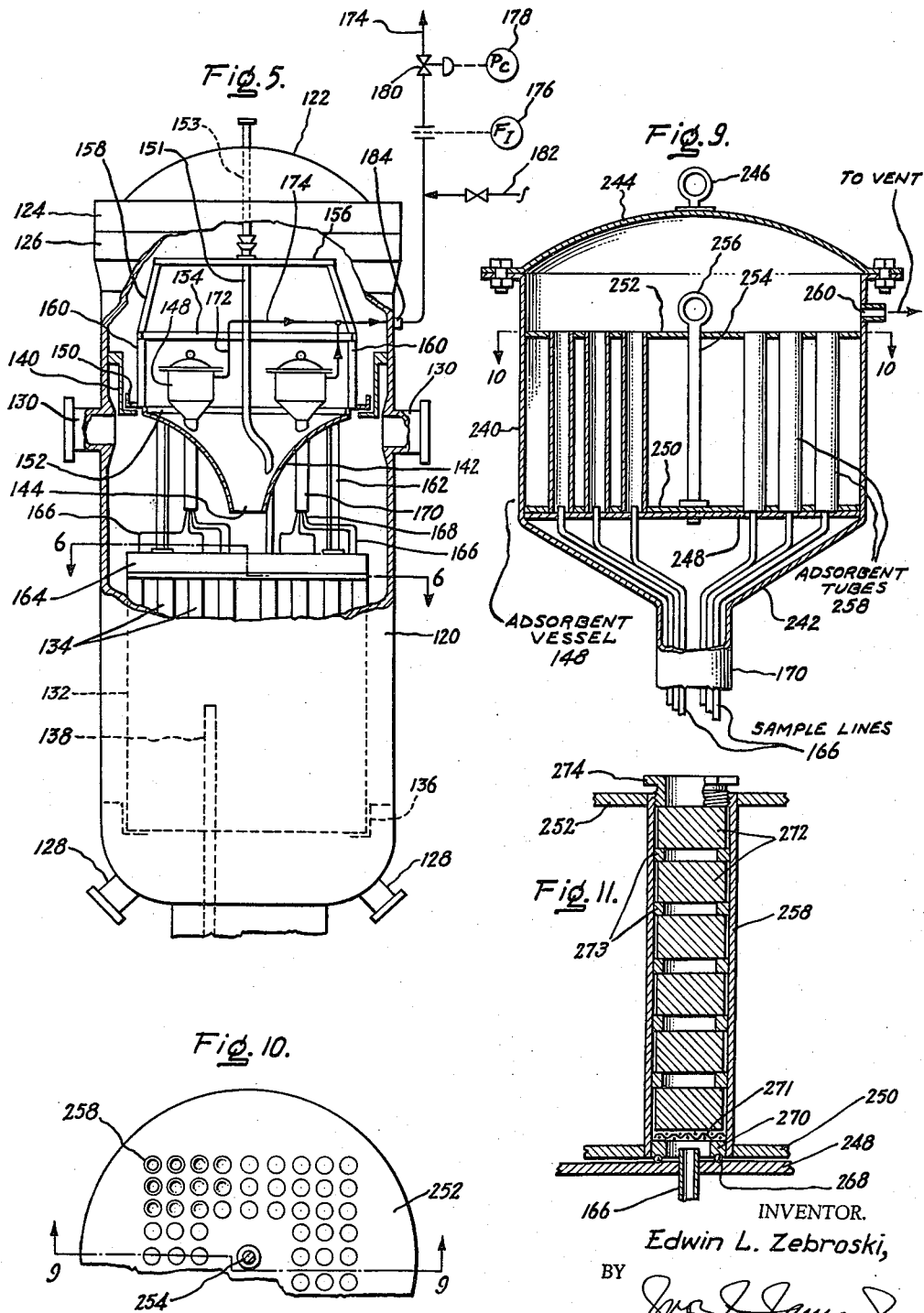
INVENTOR.
Edwin L. Zebroski,
BY
ATTORNEY.

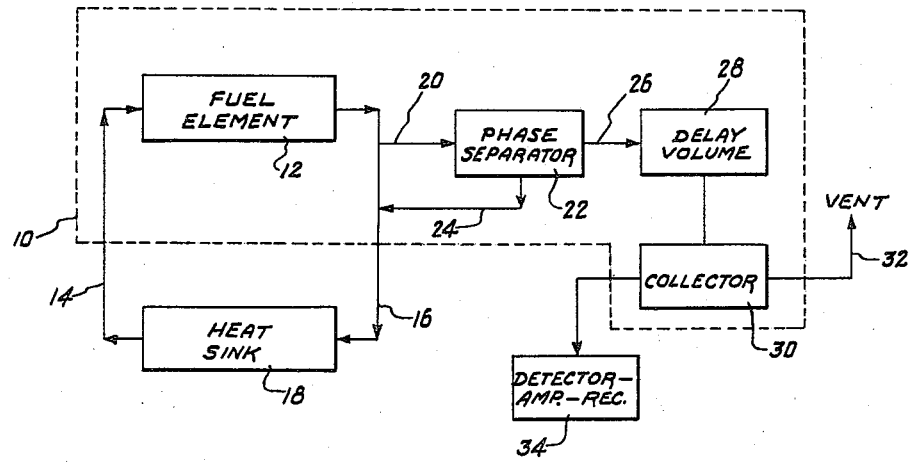
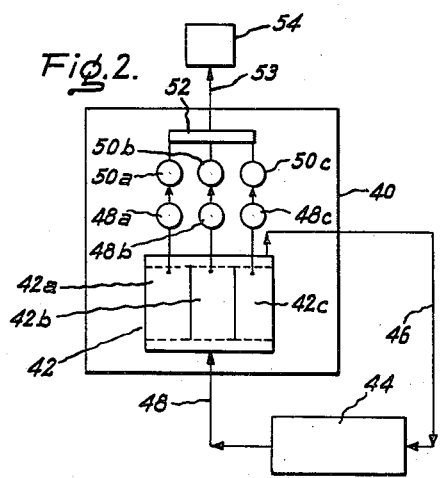
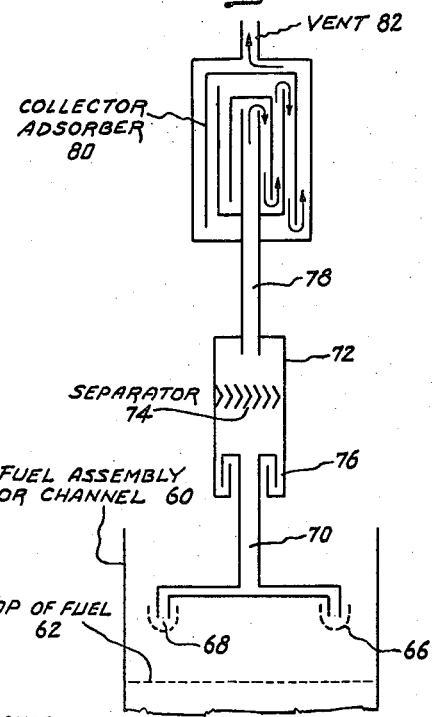
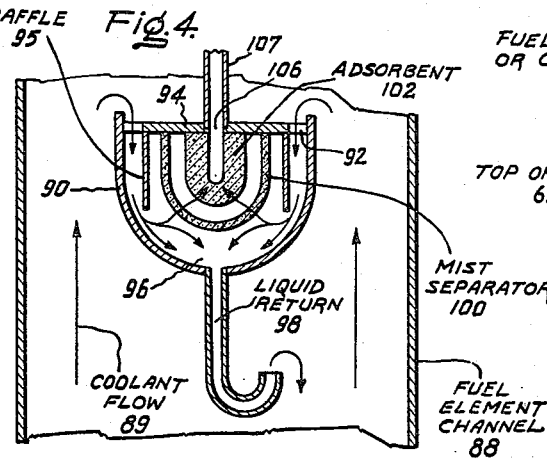

Dec. 25, 1962 E. L. ZEBROSKI 3,070,532
NUCLEAR FUEL ELEMENT LEAK DETECTOR
Filed May 13, 1958 3 Sheets-Sheet 3
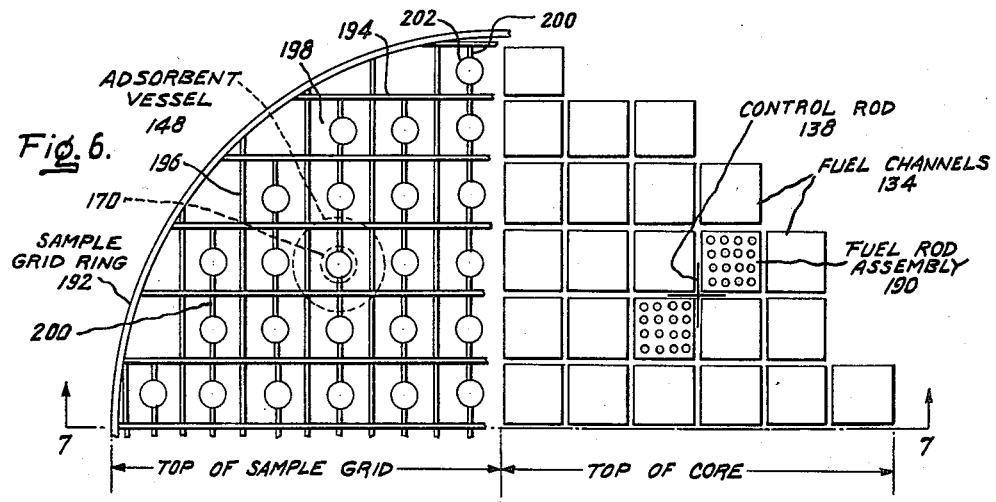
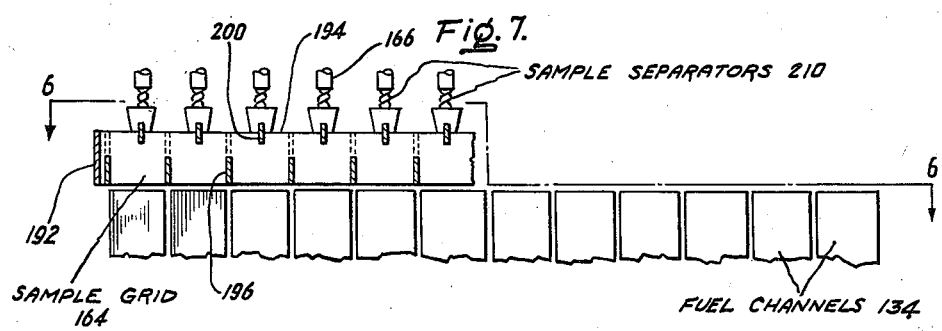
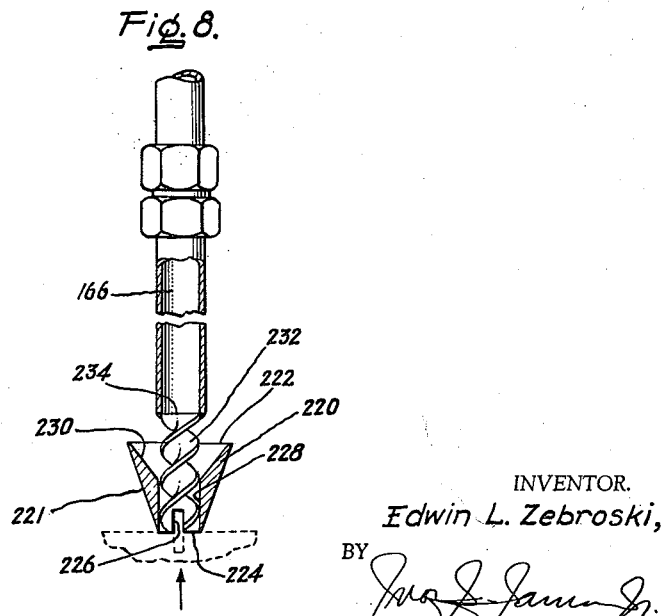
INVENTOR.
Edwin L. Zebroski,
BY
ATTORNEY.

United States Patent Office  3,070,532
Patented Dec. 25, 1962

3,070,532
NUCLEAR FUEL ELEMENT LEAK DETECTOR
Edwin L. Zebroski, Los Altos, Calif., assignor to General Electric Company, a corporation of New York
Filed May 13, 1958, Ser. No. 735,011
8 Claims. (Cl. 204—193.2)

This invention relates to the liberation of energy in nuclear reactors, and it relates more particularly to an improved method and apparatus for the detection of the existence and identity of leaking fuel elements in such reactors.

The release of large amounts of energy through nuclear fission reactions is now quite well known. In general, a fissionable atom such as $U^{233}$, $U^{235}$, or $Pu^{239}$ absorbs a thermal neutron in its nucleus and undergoes a nuclear disintegration. This produces on the average, two fission products of lower atomic weight and great kinetic energy, and from 2 to 3 neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

The kinetic energy of the fission products is quickly dissipated in ambient material as heat. If after this heat generation there is at least one net neutron remaining which induces a subsequent fission, the fission reaction becomes self-sustaining and the heat generation is continuous. The heat is removed by recirculating a coolant through heat exchange relationship with the fissionable material and a heat sink. The reaction may be continued as long as sufficient fissionable material remains in the system considering the effects of the fission products which also may be present.

In order to maintain such fission reactions at a rate sufficient to generate commercial quantities of thermal energy, nuclear reactors are presently being designed, constructed, and operated in which the fissionable material or nuclear fuel is contained in fuel elements which may have various shapes, including plates, tubes, or rods. These fuel elements are usually provided with cladding on their external surfaces and which contains no fissionable or fertile material. The elements are grouped together at fixed distances from each other in a coolant flow channel or region as a fuel assembly, and sufficient fuel assemblies are combined to form the nuclear reactor core capable of the self-sustained fission reaction referred to above. The core is enclosed within a reactor vessel through which a coolant is circulated.

The cladding serves two primary purposes; first, to resist any chemical reaction between the nuclear fuel and either the coolant or the moderator if present, and second, to prevent the highly radioactive fission products from being released into the coolant or moderator or both. Common clad materials are stainless steel, aluminum and its alloys, zirconium and its alloys, and others. The failure of the cladding can contaminate the coolant or moderator and the coolant system with intensely radioactive long-lived products, to a degree which interferes with plant operation. Replacement of the defective fuel element is thus desirable before a major clad rupture and such contamination occur.

Conventionally, the gross activity of the reactor coolant or the off gas in the system is monitored during operation, and this readily indicates the occurrence of a cladding leak somewhere in the reactor core. In such case the reactor is normally shut down when a leak is indicated before excessive coolant contamination occurs. The gross activity monitoring system does not, however, indicate which one or more of the perhaps many hundreds of fuel assemblies are defective and leaking.

The identification of the particular fuel element or elements which are defective has been accomplished in the past by continuously or intermittently sampling the effluent coolant from each fuel assembly or channel in the reactor, or from groups of such assemblies, and continuously or intermittently monitoring the radioactivity of each individual sample in a sample room located away from the reactor. This procedure, however, requires either the penetration of the reactor vessel by a large number of sample lines, or the use of valve manifolds or mechanically complex remotely-operated multi-port valves located inside the vessel, and which successively sample the effluent coolant from the various channels.

It is accordingly, a primary object of this invention to overcome the foregoing disadvantages and provide an improved process and apparatus for detection of the existence and identity of defective and leaking fuel elements in a nuclear reactor core.

It is a further object to provide for the monitoring of the radioactivity of the effluent coolant from each fuel assembly or channel in a nuclear reactor without plural penetrations of the reactor vessel and without complex valving.

An additional object is to provide a leaking fuel element detection system which effectively "integrates" the fission product leakage over a period of time and enhances the efficiency of detection.

Other objects and advantages of this invention will become apparent to those skilled in the art as the description and illustration thereof proceed.

Briefly, the present invention comprises an improved process and apparatus for detecting the existence of and identifying defective and leaking fuel elements in nuclear reactors including the steps of and means for withdrawing a sample of fluid flowing adjacent a given fuel element and containing any noble gas fission products leaking from a defective fuel element, passing at least part of the sample through contact with a body of solid adsorbent to adsorb at least part of the radioactive daughter products of the noble gas fission products, and subsequently monitoring the adsorbent to determine the presence thereon of adsorbed radioactive materials. When the fluid is a boiling coolant, the sample is separated into a vapor and a liquid phase, and the vapor is passed through the adsorbent. When the fluid is a non-boiling coolant, a vapor phase fraction is produced and separated therefrom, and is passed through the adsorbent. If no noble gas fission products are leaking into the fluid, the adsorbent radioactivity will be low, but it will be anomalously high when the fuel element is defective and leakage is occurring. In large systems where plural fuel channels or regions are employed, plural samples are taken, one from each channel, an individual adsorbent body is used to treat each sample, and an anomalously radioactive adsorbent indicates the existence of and identifies the channel or region containing the leaking fuel element as the one from which the sample contacting that adsorbent was taken. In this way even minute incipient leaks are located prior to the time they become major ruptures. Replacement fuel elements or assemblies are thus quickly and efficiently substituted for the defective ones.

In greater detail, the process of the present invention comprises the detection of fission product release through fuel element cladding through collection of daughter radioactivity from the noble gas fission products released. A sample of coolant stream, which may contain rare or noble gas fission products, is obtained from the exit region of each fuel channel, or groups of fuel channels, or regions comprising the reactor core. Each sample of coolant is then separated into liquid and gas phases, and the gas phase is conducted to an adsoptive collector which may be within the reactor vessel. After reactor shutdown, due to a fuel element leak as may be shown by a gross coolant activity rise, or in the normal course of refueling, the collectors are removed to a monitoring station. If anomalously high activity is detected on a given collector, it will indicate the channel, group of channels, or region in which the leak or leaks have occurred.

Although a major rupture may occasionally occur and will effect a relatively large increase in coolant radioactivity indicating the necessity of an immediate reactor shutdown, more commonly the cladding leaks will be tiny fissures through which fission product gases leak slowly and will not be sufficient to require an immediate shutdown. Diffusion of gaseous fission products from these fissures continues at varying rates, and due to thermal cycling of the reactor during normal operation, these fissures may gradually open up until ultimately a gross escape of fission products from a major rupture could occur.

The collection of daughter radioactivity according to this invention permits detection and identification of leaking fuel assemblies while the leaks are still in this microfissure stage, and before gross escape occurs. This is due in part, to the integrating effect of collecting, over an extended operating period, the daughter products of noble gas fission products which may be escaping at a very low rate through the tiny fissures in the clad. This rate is so low that usually it cannot be detected as gross activity in the coolant stream. By removal of the collectors from the reactor at each scheduled shutdown and by monitoring each collector, the existence of these ruptures can be detected well in advance of the time they would open up and become serious. The defective fuel assembly is replaced with a new one and operation continues. This procedure reduces significantly the number of unscheduled shutdowns due to major breaks in fuel elements.

One embodiment or application of the detection system of the present invention will be described in connection with a boiling coolant reactor. A sample of the effluent coolant from each fuel channel or region is taken. The vapor phase of the sample, containing most of the noble gas fission products, is separated from the liquid phase of the sample which is returned to the coolant flow. The vapor phase sample then diffuses or is drawn by a pressure differential through a time delay space in which between about 5 seconds' and about 5 minutes' additional vapor residence time is provided. The noble fission product gases, because of their chemical and physical constitution, do not adsorb on the surfaces of the reactor elements or in the sampling system. The vapor phase is then passed into contact with an adsorptive collector, that is a solid material having an extended surface area per unit mass or volume of solid. The daughter products of the rare gas fission products, formed during the delay period and during the period of residence time of vapor flow through this adsorbent, are collected on the extended surface area by sorptive forces. The unadsorbable vapor fraction, including the vaporized coolant and undecayed noble gas fission products, passes on through the adsorbent for disposal or return to the recirculating coolant stream.

Through this collection of rare gas daughter products, the interference or background signal normally encountered due to the presence of activated corrosion products circulating with the coolant is eliminated. The sample taken for collection and monitoring is a vapor or gas fraction which contains only negligible amounts of non-volatile substances.

The daughter products resulting from decay of various xenon and krypton fission product isotopes include the following:

| Fission product | Daughter products | | | | |
|---|---|---|---|---|---|
| | 1 | 2 | 3 | 4 | 5 |
| $Kr^{89}$ | $Rb^{89}$ | $Sr^{89}$ | | | |
| $Kr^{90}$ | $Rb^{90}$ | $Sr^{90}$ | $Y^{90}$ | | |
| $Kr^{91}$ | $Rb^{91}$ | $Sr^{91}$ | $Y^{91}$ | | |
| *$Kr^{92}$ | $Rb^{92}$ | $Sr^{92}$ | $Y^{92}$ | | |
| *$Kr^{93}$ | $Rb^{93}$ | $Sr^{93}$ | $Y^{93}$ | | |
| $Kr^{97}$ | $Rb^{97}$ | $Sr^{97}$ | $Y^{97}$ | $Zr^{97}$ | $Nb^{97}$ |
| $Xe^{137}$ | $Cs^{137}$ | | | | |
| *$Xe^{138}$ | $Cs^{138}$ | | | | |
| *$Xe^{139}$ | $Cs^{139}$ | $Ba^{139}$ | | | |
| $Xe^{140}$ | $Cs^{140}$ | $Ba^{140}$ | $La^{140}$ | | |
| *$Xe^{141}$ | $Cs^{141}$ | $Ba^{141}$ | $La^{141}$ | $Ce^{141}$ | |

*Short half lives and suitable for low power short duration test runs.

The foregoing tabulation of krypton and xenon decay chains is presented to indicate typical materials involved in the detection process of this invention.

A fraction of the rare gas fission products will decay during the transit time from the point at which the vapor phase is separated to the adsorbent collector solid. Isotopes with very short half lives relative to the delay time referred to above will not survive the trip from the fuel element leak to the vapor phase sample separator, much less the further trip on to the collector. Isotopes with very long half lives on the other extreme will undergo few decays during this trip between the fuel element leak and the collector and in the residence time while in contact with the collector. In either extreme case, the signal produced from the collector due to daughter products of these isotopes will, for a given system, be very low.

Intermediate these extremes are those rare gas isotopes which, for a given size system and given average transit time from leak point to collection or adsorption point, produce daughter products (1) at a rate sufficient to produce in the collector a monitorable signal, (2) which have half lives sufficiently long to survive the period between successive reactor shutdowns and collector examinations, (3) which have half lives which are not so excessively long as to make the signal too small, and (4) which have chemical and physical constitutions such that they may be sorbed on the collector and are resistant to removal under normal start-up, operating, and shutdown conditions of the reactor. Which of the members is actually collected and detected depends upon length of time between termination of collection and the monitoring step.

The easily measurable or high intensity emission members of decay chains other than the mass 140 chain generally have shorter half lives than 12.8 day $Ba^{140}$. The signals from members of these decay chains therefore will only be detectable for relatively short periods of time after either reactor shutdown or cessation of a leak for any other reason. It is normally expected that once a leak has started, and an initial burst of activity due to the accumulated gas inventory in the element has been released, there will be a continuing steady state rate of release of fission gases at a rate proportional to the power generation in the leaking rod with only temporary interruptions after a decrease in power level. The observable activity actually used for leak location depends upon the delay time between the end of a leak, such as by shutdown of the reactor, and the time of monitoring of the adsorbent for any given decay chain. The shorter lived chains are useful for observation and location of leaks under the following three modes of operation.

The first involves a rapid shutdown and adsorbent examination. In this case the system is essentially as described in the subsequent figures. By providing rapid means of access to the collector elements, for example, through a special port in the reactor vessel, within a few hours of reactor shutdown a number of the shorter lived activities would be observable.

The second involves short time operation of the reactor at low pressure. By providing adequate enclosure and ventilation, a light weight readily removable head for example, a power reactor can be operated for a short time at lower power, say 1 to 5% of full power, at low pressure. The period of time required for cooling the reactor system and opening high pressure closures is eliminated so that access to the collector elements can be obtained within a very short time after reactor shutdown, for example, within an hour or less. In this case a large variety of relatively short-lived daughter activities would be observable, including $Rb^{88}$, $Rb^{89}$, $Rb^{90}$, and $Cs^{138}$, $Cs^{139}$. This method of operation can be adopted in the event that the normal signal was lost through operational error or equipment malfunction. In this case, clean collector elements are installed, the reactor run for a period sufficient to approach saturation level of the short lived activities, 0.5 to 1 hour, and the collectors subsequently examined after a delay period of one hour or less.

The same second system can also be applied for a mode of operation in which no leak-location system is normally provided during reactor operation. A grid carrying the collector system is affixed to the core outlet after shutdown of the reactor from a power run, following which a short run at low pressure as described above is used to collect a signal from which to locate the leak. The collector grid system is then removed from the reactor vessel prior to the next run at power.

The third mode involves continuous or semi-continuous scanning or monitoring of the adsorbent radioactivity. By providing a nozzle in the reactor vessel, the assembly of the collectors and sample lines can be displaced from the body of the pressure vessel itself by a distance which eliminates direct radiations from the reactor core. The collector basket can be so disposed that access to it during operation can be obtained by radiation sensing devices. For example, thimbles of relatively thin wall to provide small attenuation of gamma radiation from 0.5 to 2 mev. in energy are provided adjacent each collector element. A suitably shielded or collimated radiation detector is then placed into each thimble either intermittently or continuously. This system permits scanning of the activities on each of the collectors at will, either during operation or shortly after shutdown, and irrespective of whether the system was still at operating temperatures and presures. For continuous monitoring, care is taken to provide sufficient delay time between the collector chamber and the sample intake point (3 to 10 half lives of $O^{19}$) in the sample system so that short lived activities of the coolant (for example, $N^{16}$ and $O^{19}$) do not provide significant background.

In the case where the daughter products are collected and monitored intermittently, or other than continuously as described above, it is the longer lived daughters which collect on the adsorbent and are retained sufficiently to endure the time of shutdown, vessel opening, and adsorbent removal for monitoring.

In either the continuous or intermittent monitoring case, the principles of this invention are the same.

Typically suitable for intermittent detection is $Xe^{140}$ and its radioactive daughter products. The $Xe^{140}$ escapes from the fuel element by diffusion and by recoil from the fuel element surface, then through the cladding fissure into the coolant. In a boiling water reactor for example, the rare gas distribution between the steam and water phases is approximately 80% and 20% respectively for a fuel channel delivering a 50–50 mixture of steam and water by volume at 1000 p.s.i. and 544.6° F. The mixture flows past the sample point near the fuel channel outlet where a coolant sample is taken. A separation of the sample is made producing a vapor sample containing less than 0.1% by weight of liquid phase or mist and consisting of a vaporized coolant and permanent gases including any rare gas fission products which have leaked into the coolant. This sample continues through the delay volume provided by the sampling-separating-collecting system to the adsorbent.

The $Xe^{140}$ decays with a 16-second half life to $Cs^{140}$ by beta emission which in turn decays with a 66-second half life to $Ba^{140}$ by beta emission. $Ba^{140}$ decays with a 12.8 day half life to $La^{140}$ by beta emission and gamma radiation, and $La^{140}$ has a 40-hour half life, decaying by beta and gamma radiation.

Part of $Cs^{140}$ formed is accumulated by adsorption on the collector surface and continues its normal decay at this point. Due to the relatively short half life of $Cs^{140}$, it is the longer-lived $Ba^{140}$ and $La^{140}$ daughter products which are responsible for the signal generated on the adsorbent. The $La^{140}$ emits gamma rays of which about 97% are 1.6 mev. and about 2.5% are 2.5 mev. Some spurious trace activity results from contaminants or from neutron activation of the adsorptive collector. The resulting gamma radiation is considerably weaker than the gamma radiation from $La^{140}$. Accordingly, by biasing the monitor so as to be insensitive to lower energy gamma radiations, i.e., below about 1.6 mev., the detection becomes insensitive to trace contamination on and neutron activation of the adsorptive collector and is substantially specific for $La^{140}$.

Similarly in the krypton decay chain, the rubidium daughters collected on the adsorbent have very short half lives, and the longer lived strontium and yttrium daughters account for the signal observed after all but very short runs.

In boiling water reactors, this detection process is free from short-lived radioactivities induced by neutron activation of the coolant. Activation products include $N^{16}$, $O^{19}$, $F^{18}$, and $A^{41}$. No signal due to these products is emitted from the adsorbent because they are not cumulatively adsorbed, the small amounts adsorbed decay to negligible levels in less than 24 hours, and none of them has radioactive daughter products. No signal results from activated corrosion products, such as Fe, Ni, Co, Mn, or Na recirculating with the coolant because their concentration is kept very low by continuous coolant demineralization and because over 99.99% of such products and other non-volatile materials are rejected with the liquid fraction of the coolant sample in the separator producing the vapor sample to be adsorbed.

The present invention, particularly the detailed structure of several embodiments of the apparatus of this invention and its operation, will be more readily understood by reference to the accompanying drawings in which:

FIGURE 1 is a schematic block diagram showing the general sequence of operations of the method of this invention, FIGURE 2 is a schematic diagram showing the present invention applied to a nuclear reactor through which a coolant is recirculated, FIGURE 3 is a schematic elevation view of a nuclear reactor fuel region or channel through which the coolant flows and showing the location of the essential elements and operations of this invention, FIGURE 4 is an elevation view in cross section of a simplified integral vapor-liquid separator and adsorbent collector device for disposition within the flow channel according to this invention, FIGURE 5 is an elevation view in partial cross section of a typical nuclear reactor vessel showing the location of the sampling and adsorbent vessel above or apart from the reactor core flow channels, FIGURE 6 is a split plan view of FIGURE 5 showing in the northeast quadrant the top of the reactor core with its fuel element assemblies and flow channels, control rods, and fuel elements, and showing in the northwest quadrant the top of the sampling grid and the location of one of the four adsorbent vessels, FIGURE 7 is an elevation view of FIGURE 6 showing the upper end of the reactor core, the sampling grid, the sample separators, and the lower ends of the sample lines, FIGURE 8 is an enlarged elevation view in partial cross-section showing the detail of the centrifugal sample separator and sample line located in the sampling grid at the point the coolant sample is taken, FIGURE 9 is an elevation view in cross section of the adsorbent vessel showing the individual adsorbent holder tubes, sample lines, and the sample line protector tube, FIGURE 10 is a plan view of the adsorbent vessel shown in FIGURE 9, and FIGURE 11 is an elevation view in cross-section of an individual adsorbent holder tube showing the disposition of a typical body of adsorbent therein.

Referring now more particularly to FIGURE 1, a schematic diagram showing the process steps of this invention is presented. The bounds of the reactor vessel are indicated at 10 and contains fuel element or fuel region 12. Coolant enters and leaves the vessel 10 by means of lines 14 and 16. The heated coolant is circulated through heat sink 18 where the heat is removed. The heat sink may be a heat exchanger, a turbine and condenser system, or both, or other known heat using device. A sample of the coolant in stream 16 is taken at the effluent point from fuel region 12 by means of line 20 and passed into vapor-liquid phase separator 22 which is optional with gas phase coolants. The liquid phase is rejected and may be returned by line 24 to any convenient place in the coolant cycle. The vapor phase, containing any noble gas fission products such as xenon and krypton, is passed through line 26 and an effective delay volume 28. This volume may wholly or in part be made up of the volume of the sample handling lines and vessels. The total delay time between sample taking to adsorption may vary from about 5 seconds to about 5 minutes. Finally, the vapor phase sample is passed through contact with a sorptive solid material in zone 30 by means of which any noble gas daughter products are retained by physical or chemical sorption forces, or both. A known vapor residence time is provided in adsorption zone 30, preferably between about 0.1 to 2 half lives of the noble gas isotope parent of the daughter isotope chosen for detection. The unadsorbed gases, including any carrier gases, are passed through line 32 to a low pressure region or vent. Means are provided in connection with the vent lines 32 to prevent back diffusion of the vented unadsorbed fraction of the vapor phase samples which would otherwise cross-contaminate the adsorbent. Such means comprise an elongated vent line opening into a low pressure region containing thoroughly mixed effluent from all channels. Back diffusion of effluent from one leaking channel effluent to contaminate the adsorbent corresponding to another channel is eliminated.

The solid sorbent material is removed from collector zone 30 to proximity of zone 34 which includes radioactivity sensing-counter-detector-amplifier-recorder equipment. The function here is to detect and record the radioactivities of individual adsorbent bodies in groups or in sequence and distinguish those which have anomalously high values. This serves to identify and locate a defective fuel channel or region. It should be understood that FIGURE 1 merely illustrates the process as applied to a single fuel assembly, and that in actual practice the many hundreds of individual fuel assemblies or fuel regions in a large nuclear reactor are similarly sampled and monitored. The monitoring by measurement of the radiation from the collector may be done either continuously, or else intermittently as previously described. Intermittent measurement may be done a considerable time after reactor shutdown.

FIGURE 2 is another schematic diagram showing the general physical relationship of some of the various zones referred to in FIGURE 1. Nuclear reactor vessel 40 containing reactor core 42 is illustrated as containing three fuel channels or regions 42a, 42b, and 42c. Coolant circulation system and heat sink 44 with lines 46 and 48 are provided as in FIGURE 1. The samples are taken at the upper outlets of channels 42, they pass respectively to phase separators 48a, 48b, and 48c, and the vapor fractions pass respectively into sorptive collection chambers 50a, 50b, and 50c. Unadsorbed gases collect in plenum 52 from which they vent through line 53 to a region 54 of the coolant circulating system which is at a lower pressure. Reactor pressure vessel 40 surrounds the core 42, separators 48, and collectors 50.

FIGURE 3 shows a simplified detail of one modification of the separator-collector device of this invention and which is provided for each fuel region of the reactor core to be separately monitored. Fuel channel or region 60 is provided extending somewhat above the top 62 of the active fuel zone. Coolant flows upwardly as indicated at 64. Part of the coolant passing deflector 66 enters the lower end 68 of sample line 70 and flows therethrough at a rate determined by flow resistance and pressure drop conditions which are maintained by the relative locations and pressures of the intake and vent points. The sample enters separator vessel 72 and contacts separator turning vanes 74. The separated liquid phase is rejected through drain line 76. The separated vapor phase continues through line 78 into collector adsorber 80 where sufficient solid surface is provided to collect and retain at least part of the daughter products of any noble gas fission products leaking from the fuel. Unadsorbed gases are vented to the lower pressure region through line 82.

In FIGURE 4 is shown a simplified detail cross-section drawing of another modification of the sampling and collecting device of this invention. In a boiling, water-moderated and water-cooled reactor, for example, the mixed steam and water coolant stream issuing from a reactor core flow channel 88 as indicated at 89 is deflected by a solid thimble or container 90. Steam containing some water flows or diffuses into the annular gap 92 between the base plate 94 and the container 90 and flows down between the container wall and baffle 95. The remainder of the water settles out in the stagnant volume 96 and is removed by way of liquid return drain tube 98. The steam, containing the noble gas fission products, diffuses through coarse fluid-permeable element 100 which acts as a mist separator and particulate material barrier. The unadsorbed vapor fraction flows on through opening 106 in base plate 94. To prevent contamination of the adsorbent by coolant water and to minimize back diffusion of radioactive materials to adsorbent 102 from adjacent fuel channels which may also be leaking, a vent line 107 is provided from opening 106, and leading to a lower pressure point. This may either be a point outside the reactor vessel as indicated in FIGURES 1 and 2, or it may merely extend into a region in the reactor vessel where the coolant from all of the channels is thoroughly mixed. This distance may be of the order of a few feet.

In this modification of the device, the operation depends upon the existence of a coolant vapor phase in the fuel channel effluent. At low power there will be none, and the device will fill with liquid coolant. When the vapor phase becomes appreciable, the device drains via line 98. By gamma ray heating of the adsorbent, the liquid phase coolant retained thereby evaporates in a few minutes. Coolant vapor and any noble gas fission products mixed with it then begin to flow into the adsorbent. Repeated cycling from wet to dry condition tends to leach some daughter products from the adsorbent. This effect is minimized by choice of the geometry of the separator-filter and of the adsorbent plug so as to limit the volume of water which comes in contact with the adsorbent. This effect is, however, unimportant in this invention, since the most water soluble daughter products, namely rubidium and cesium, have very short half lives. The longer-lived daughters, such as strontium and barium, are considerably less soluble and are retained in spite of any leaching effect. Lanthanum or yttrium are not substantially affected either. This is due to the successively stronger adsorption of dipositive and tripositive ions.

Referring now to FIGURE 5, an elevation view in partial cross section of a typical high pressure commercial scale nuclear power reactor vessel 120 is shown provided with a removable upper head 122 and head flanges 124 and 126. Coolant inlets 128 enter the vessel at the lower end, and coolant outlets 130 are provided somewhat above the mid-height of the vessel. The reactor core 132, consisting of a plurality of vertically disposed, parallel, fuel assembly and flow channels or regions 134, is supported in the vessel by means of support 136. The channels or regions are open at top and bottom to permit coolant flow therethrough, and each channel surrounds or includes a bundle of individual nuclear fuel elements as shown in FIGURE 6. A typical control rod is indicated generally at 138 and extends into the core to permit variation in the rate of heat generation.

Disposed peripherally around the inner wall of vessel 120 is a support means 140, here shown as a ring of L-shaped cross-section forming a support shelf. Supported on this shelf by means of support element 150 is a removable structural assembly consisting of lower ring 152, middle ring 154, and upper ring 156 spaced vertically apart from one another and connected by vertical members 158 and 160. Suspended from the lower ring 152 is an upwardly flaring coolant turning vane 142 having lower open end 144 and serving to deflect heated coolant, flowing from core 132, laterally toward the several coolant outlet nozzles 130. As shown in the drawing, the upper outer periphery of the turning vane lies just above the outlet nozzles. A typical instrument line 151 for in-core instrumentation extends vertically from the top of core 132 to the top part of the removable assembly, where it joins line 153 attached to and extending through vessel head 122. Suspended from lower ring 152 by means of support members 162 is sample separator and core hold-down grid 164 located just above the upper face of reactor core 132. The heated coolant passes upwardly through sample separator grid 164 and coolant samples are taken continuously from the effluent of each flow channel. The plan views of both the reactor core 132 and grid 164 are shown in FIGURE 6 subsequently described.

From the various sampling points in grid 164, sample lines 166 pass upwardly into bundles 168, enclosed by sample line protector tube 170, and enter adsorbent collector vessel 148. The structure of these vessels, their contents, their number, and their disposition through the vessel cross-section are all shown more clearly in FIGURES 6 to 11, described below.

Vent line 172 opens from each collector vessel 148 through header 174 and discharges to a low pressure region of the coolant recirculation system. Although this low pressure point may be in the reactor vessel dome itself, it is shown in FIGURE 5 external to the reactor vessel. Flow indicator 176, pressure controller 178 and valve 180, and purge inlet 182 are all provided in vent line 174. By means of controller 178, the sample flow rate is controlled at a proper value in relation to the volume of the sampling and collection system so that the delay time after sampling and the residence time of the sample in the collector vessels are maintained within the limits specified above. It should be noted that no complex valves are required, and that only a single vent line 174 penetrates reactor vessel 120 at point 184.

In FIGURE 6 a split plan view is presented showing the northwest quadrant of the sampling grid and the northeast quadrant of the top of the reactor core. Elements also shown in FIGURE 5 are here designated by the same numerals. In the northeast quadrant are shown square fuel channels 134, each containing an assembly of fuel elements 190, and control rod 138 having cruciform cross-section operating between four adjacent channels. In the northwest quadrant, the sample grid 164 is shown in detail. It is contained within a circular grid ring 192 which serves as the end support for a system of east-west rib members 194 and north-south rib members 196, intersecting at right angles forming an egg-crate type grid. The spacing is such as to form a plurality of square sample openings or cells 198 corresponding to and aligned with the end of each of the fuel channels. Extending across the center of each sample cell 198 is a sample separator support member 200 which serves to locate a sample separator indicated generally as 202 in the center, or any other selected position, of the fuel channel effluent. The location of one of the adsorbent collector vessels 148 is shown together with its sample line protector tube 170.

In large reactor systems, such as that illustrated here, the number of fuel channels or regions is large. The number of samples which must be collected in individual adsorbent bodies dictates that the collectors preferably be located as shown in FIGURES 5 and 6. One-fourth of all the sample collectors are disposed in a separate collector vessel, and the four vessels are disposed as shown, one in each quadrant of the vessel. Other multiples of collector vessels may be used for larger or smaller numbers of fuel regions or channels.

Referring now to FIGURE 7, which is an elevation view of FIGURE 6 taken as indicated, the top of the several fuel channels 134 and the sample separator grid 164 are shown. The intersecting members 194 and 196 of the grid are supported at their ends by grid ring 192. The lower ends of the sample lines 166 extend down to centrifugal sample phase separators 210, the structure of which is detailed in FIGURE 8. These separators are supported in each sample cell by support member 200. The alignment between the upper end of each fuel channel and the opening or sample cell in the egg-crate sample grid is clearly shown.

In FIGURE 8 is shown an enlarged detail cross-section view of the sample phase separators 210 referred to previously. The separator consists of a body member 220 having an exterior surface 221 flaring upwardly in the flow direction to deflect coolant flow. It is open at its upper and lower ends 222 and 224. Slot 226 is provided across a diameter of the lower opening to engage the separator support members 200 shown in FIGURE 7. The inner opening consists of a lower inlet cylindrical portion 228 and an upper outlet flaring portion 230. Sample line 166 is coaxially aligned with body member 220. A twisted or spiral vane 232 extends from the lower open end of sample line 166 and into and substantially through the opening in separator member 220. The major part of the coolant flow passes upwardly around body member 220, a minor portion enters the lower opening 224, this portion follows a helical path at high velocity around vane 232, forcing the liquid portion outwardly away from sample line inlet opening 234 across flaring surface 230. Thus the fluid entering sample line 166 is substantially entirely vapor and it flows at a controlled rate through the sampling and into the adsorbent collecting system as previously described.

Referring now to FIGURES 9 and 10, a detailed cross-section elevation view of the adsorbent holder vessel 148 shown generally in FIGURE 5, and a partial plan view are shown respectively. The vessel 148 is formed of the central cylindrical section 240, a lower conical transition section 242 connected to the top of sample line protector tube 170 surrounding sample lines 166, and is provided with an upper removable head 244 and lift ring 246. An adsorbent holder support plate 248 is located horizontally at the bottom of the vessel 148. It is perforated in a pattern similar to that shown in FIGURE 10 to receive the upper ends of sample lines 166. The holder vessel is preferably made of a neutron adsorbing material, such as boron steel to minimize neutron activation of the collector adsorbent.

Supported within vessel 148 and upon plate 248 is the collector holder assembly consisting of lower plate 250, upper plate 252, central spindle 254, lift ring 256, and a plurality of adsorbent holder tubes 258 supported between the plates 250 and 252. These tubes are open at their upper end and lower ends, and are arranged in a pattern around central spindle 254 as indicated in FIGURE 10, in which upper plate 252, the spindle, and the holder tubes 258 are shown. Other patterns obviously can be substituted if desired. Fluid outlet 260 is provided opening from the upper part of vessel 148 by means of which the unadsorbed portion of the samples taken is removed and conducted via line 172 shown in FIGURE 5, to a low pressure sink to maintain the controlled flow of sample vapor.

Referring finally to FIGURE 11, a detailed vertical cross-section is shown of the structure and contents of the adsorbent collector tube 258. Elements previously described are designated by the same numbers. Adsorbent support ring 270 is fitted into the lower end of tube 258 and surrounds the upper end of the sampling tube 166. Seal 268, such as an O-ring, may be provided at the lower end of tubes 258 to prevent sample mixing. At least one fine mesh support screen 271 is set on support ring 270, and a series of alternate adsorbent plugs 272 and separator and seal rings 273 fill the remaining space, with an upper hold-down or retainer ring 274 provided. The adsorbent in this example consists of a cylindrical fluid permeable plug of graphitic carbon. Other solids such as stainless steel, aluminum, zirconium, nickel or other material perforated to be fluid permeable and which suitably resists corrosion in the reactor environment may be used. Use of high-purity spectroscopic grade graphite minimizes background radiation otherwise induced by neutron activation of the collector if it is desired to have the collector internal to the reactor vessel as shown here.

The modification of this invention described above and illustrated in FIGURES 5 through 11 is typical of its embodiment applied in a commercial scale nuclear power generation system. The following data are given as illustrative of the structure and operation of such a system which liberates nuclear heat at the rate of 685 megawatts and generates electrical energy at a gross rate of 192 megawatts and at a net rate on the line of 180 megawatts.

The nuclear reactor vessel is 13 feet in diameter and 42 feet high, the reactor core consists of 488 square channels 3.75 inches by 3.75 inches on a side, 10 feet long, and containing 36 zirconium-clad $UO_2$ fuel rods about 0.56 inch in outside diameter. The enrichment is 1.5%. The coolant-moderator is light water circulated through the core at a rate of about $26 \times 10^6$ pounds per hour. The coolant is partially vaporized producing saturated steam at 1000 p.s.i. at a rate of about $1.5 \times 10^6$ pounds per hour. The 488 sample separators are located in the sampling grid which covers the top of the core, the sample lines are segregated into four bundles of 122 lines each, and connected into the four adsorbent collector vessels as shown. The volume of each adsorbent tube is about 150 cubic centimeters, and the sample flow rate is about 300 cc./min. of vapor through each adsorbent mass. The adsorbent used is graphite, each tube containing about 100 grams of this material. The sample system volume and the flow rate of the samples taken are in this particular instance designed for the collection of $La^{140}$ as the active daughter of the escaping noble gas fission products.

In normal operation the reactor run is continued for periods up to 180 days, at the end of which the reactor is shut down for routine maintenance. The vessel is opened, scheduled refueling is done, and the adsorbent collectors removed for the monitoring. If any anomalous radioactivity is detected, an actual or incipient rupture exists, and a new fuel assembly is substituted for the defective one. Such anomalous activity is that greater than the average of all of the adsorbent activities. The exclusion from detection of lower levels than about 1.0 mev. may be effected with conventional radiation detection instruments and amplifiers and pulse analyzers as previously indicated. In this manner signals from tracers of corrosion products, coolant activities, and other materials do not interfere with the desired signal from $La^{140}$.

The process of this invention is readily applicable to non-boiling or liquid coolant nuclear reactor systems by taking a hot coolant sample, depressuring it through a flow restriction such as an orifice, located at the inlet to the separator body shown in FIGURE 8, for example, then separating the liquid from the vapor phase found, and detecting the activity of the vapor in the manner described. It is likewise applicable to gas cooled reactor systems by merely taking a sample of the effluent gas from each fuel channel and passing it through the adsorbent.

As adsorbent collector, any solid, metallic, or non-metallic surface may be used, provided it is compatible with the pressure, temperature, chemical, and nuclear conditions existing. Preferably fluid permeable solid forms having relatively high surface area to volume ratios between about 20 to 500 (in consistent units such as $cm.^2/cm.^3$) are used, the higher values being preferred to minimize the attenuation of radiation to be detected. Such metallic solids may be employed as an array of thin parallel plates or concentric tubes as shown in FIGURE 3, or such other finely divided materials as Raschig rings, spheres or other granules, helices, metal punchings, foils, wires, metallic wools, and the like may also be used. Non-metallic adsorbents may also be used, such as alumina, zirconia, and various adsorbent metallic oxides, carbides, or silicides, natural or artificial graphitic or carbonaceous materials such as the various commercial carbons or charcoals, or combinations of these having a sufficient surface to volume ratio and adsorption capacity. Thus the adsorbent may be finely divided or granular, or formed into any other convenient geometry. The extremely high adsorption capacities and the activated adsorbents required in gas adsorption and in gas mixture fractionation may be used but are not required in the practice of this invention.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. An apparatus for identifying a fuel channel containing a leaking fuel element in a nuclear reactor core which contains a plurality of such fuel channels through which a fluid is passed and which is contained in a reactor vessel, which apparatus comprises a vapor-liquid separator means disposed within said vessel in fluid-receiving relation to and adjacent the outlet of each of said fuel channels, an equal plurality of individual solid adsorbent bodies disposed within said vessel apart from said fuel channels, means for passing a vapor sample from each of said separator means through contact with one of said adsorbent bodies to adsorb thereon radioactive daughter products of noble gas fission products leaking into said fluid, means for removing the unadsorbed fractions of said vapor samples from said adsorbent bodies and from said vessel, and means for measuring the radioactivity of each adsorbent body to detect the defective fuel channel by an anomalously high radioactivity of the corresponding adsorbent body.

2. In a nuclear reactor apparatus comprising a pressure vessel, a nuclear chain reacting core disposed within said pressure vessel and having a plurality of coolant flow channels containing nuclear fuel elements, and means for passing a coolant fluid through said channels to remove heat therefrom, the improved apparatus for identifying a flow channel containing a leaking fuel element which comprises a sample separator grid disposed adjacent the effluent end of said core, at least one adsorbent collector vessel supported adjacent said grid, a plurality of individual adsorbent tubes contained in said collector vessel, a solid adsorbent body contained in each of said tubes, a vapor-liquid separator having a mixed fluid inlet and a vapor outlet and a liquid outlet opening supported by said separator grid in mixed fluid-receiving relation with the effluent from each of said flow channels, a sample conduit communicating the vapor outlet of each separator with the inlet of one of said adsorbent tubes, an outlet manifold communicating a low pressure region with the outlet end of each of said adsorbent tubes, and means for controlling the flow of fluid through the adsorbent collector vessel to adsorb on said adsorbent the radioactive daughter products of any noble gas fission products leaking from a fuel element into the coolant flow through one of said flow channels so the anomalously high radioactivity of the adsorbent identifies the channel containing the leaking fuel element.

3. An apparatus according to claim 2 wherein said outlet manifold opens through the wall of said pressure vessel and communicates with a low pressure point in the coolant recirculation system.

4. An apparatus according to claim 2 wherein said vapor-liquid separator comprises a separator body having an exterior surface flaring in the flow direction and a central opening therethrough consisting of an inlet cylindrical portion and an outlet flaring portion, and a spiral vane extending substantially from the inlet end of said central opening and therethrough into engagement with the inlet end of the sample conduit communicating in vapor-receiving relation therewith.

5. An apparatus according to claim 2 wherein said adsorbent collector vessel is provided with a removable head, a support plate disposed across the bottom of said vessel, a removable collector holder assembly supported on said plate within said vessel, said holder assembly consisting of spaced parallel lower and upper plates with a plurality of said adsorbent tubes extending therebetween, each of said sample conduits extending into said collector vessel and terminating at one end of one of said adsorbent tubes.

6. An apparatus according to claim 5 wherein the solid adsorbent body contained in said adsorbent tubes comprises a fluid permeable solid material having a surface area to volume ratio between about 20 and about 500.

7. An apparatus according to claim 2 in combination with a removable structure supported in said pressure vessel above said core, an upwardly flaring coolant turning vane having its upper and outer periphery disposed just above the reactor vessel coolant outlet and supported from said assembly, said sample separator grid being suspended from said assembly below said turning vane, said adsorbent collector vessel being supported in said assembly above said turning vane, and a sample conduit protector tube extending downwardly from said collector vessel through said turning vane and enclosing the plurality of sample conduits.

8. A method for detecting the existence of and identifying a fuel channel containing a leaking fuel element in a nuclear reactor core including a plurality of fuel channels and contained in a reactor vessel, which method comprises continuously withdrawing a sample of fluid flowing through each fuel channel, continuously separating a vapor phase fraction containing any noble gas fission products from the sample of fluid within said vessel, controlling the flow rate of the vapor phase fraction to provide a delay period of between 5 seconds and 5 minutes to permit a partial decay of said noble gas fission products into the radioactive daughter products thereof, continuously passing each vapor phase fraction through contact with one of a plurality of individual bodies of solid adsorbent disposed in said vessel apart from said core, maintaining each vapor phase sample in contact with said body of solid adsorbent for a residence time equivalent to from 0.1 to 2 half lives of the noble gas fission product parent isotope of the radioactive daughter product isotope chosen for detection to adsorb at least part of said radioactive daughter products leaving an unadsorbed vapor fraction, removing said unadsorbed fraction from said vessel to maintain sample flow, and subsequently monitoring the plurality of bodies of adsorbent to determine the identity of a fuel channel containing a leaking fuel element by an anomalously high radioactivity of the corresponding adsorbent; said body of solid adsorbent comprising a fluid permeable mass compatible with chemical and irradiation conditions existing within the reactor vessel and having a surface area to volume ratio of about about 20 cm.$^2$/cm.$^3$.

References Cited in the file of this patent

UNITED STATES PATENTS

| | | |
|---|---|---|
| 2,807,580 | Fenning et al. | Sept. 24, 1957 |
| 2,873,242 | Treshow | Feb. 10, 1959 |
| 2,987,459 | Labeyrie et al. | June 6, 1961 |

FOREIGN PATENTS

| | | |
|---|---|---|
| 1,127,618 | France | Aug. 13, 1956 |
| 793,905 | Great Britain | Apr. 23, 1958 |

OTHER REFERENCES

Progress in Nuclear Energy, Series II, "Reactors," McGraw-Hill, 1956, page 371.

Proceedings of International Conference on Peaceful Uses of Atomic Energy, August 8–20, 1955, vol. 3, pages 86–90; vol. 2, pages 276, 358.

Nucleonics, vol. 14 (December 1956), pages S20, S21, vol. 15 (July 1957), pages 60–63. (Article by Harrer.)

Atomics and Nuclear Engineering, vol. 8 (May 1957), pages 181–183.